Sept. 9, 1947.   H. J. DE N. McCOLLUM   2,427,221
AIRCRAFT HEATING APPARATUS
Filed Jan. 15, 1943   3 Sheets-Sheet 1
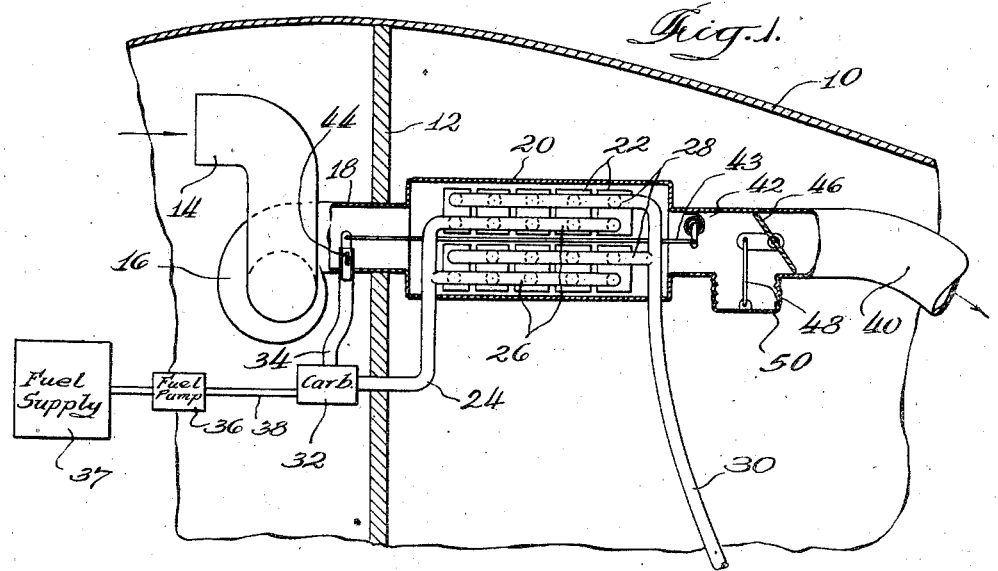
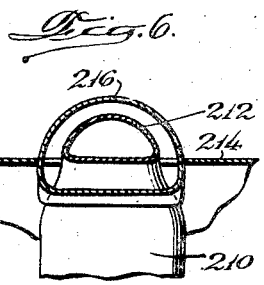
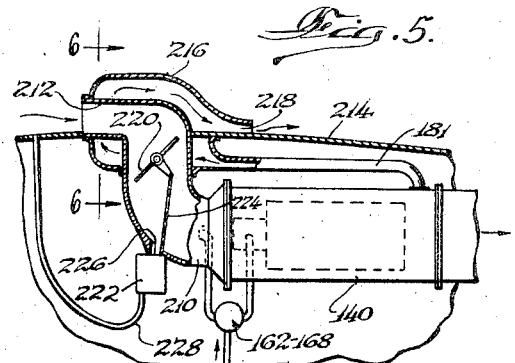
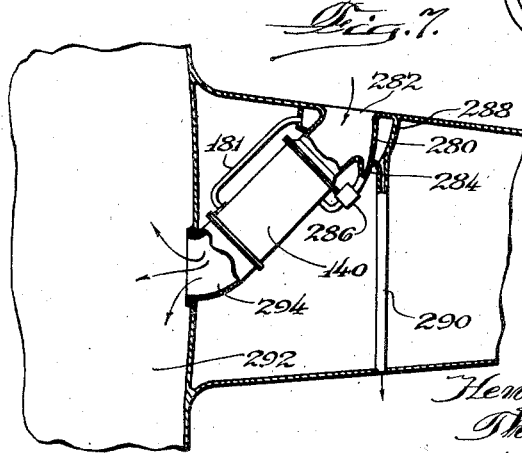

Sept. 9, 1947. H. J. DE N. McCOLLUM 2,427,221
AIRCRAFT HEATING APPARATUS
Filed Jan. 15, 1943 3 Sheets-Sheet 2
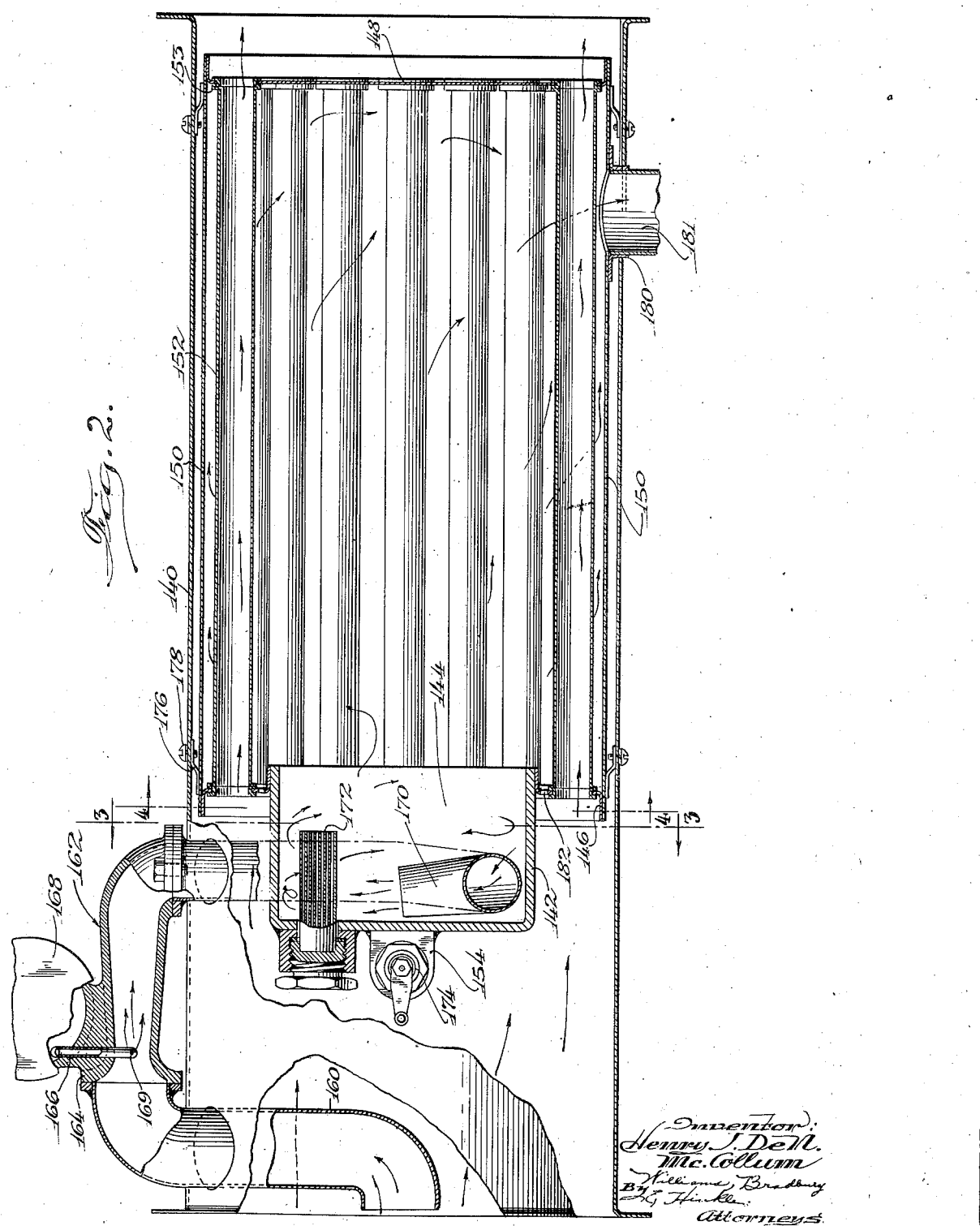

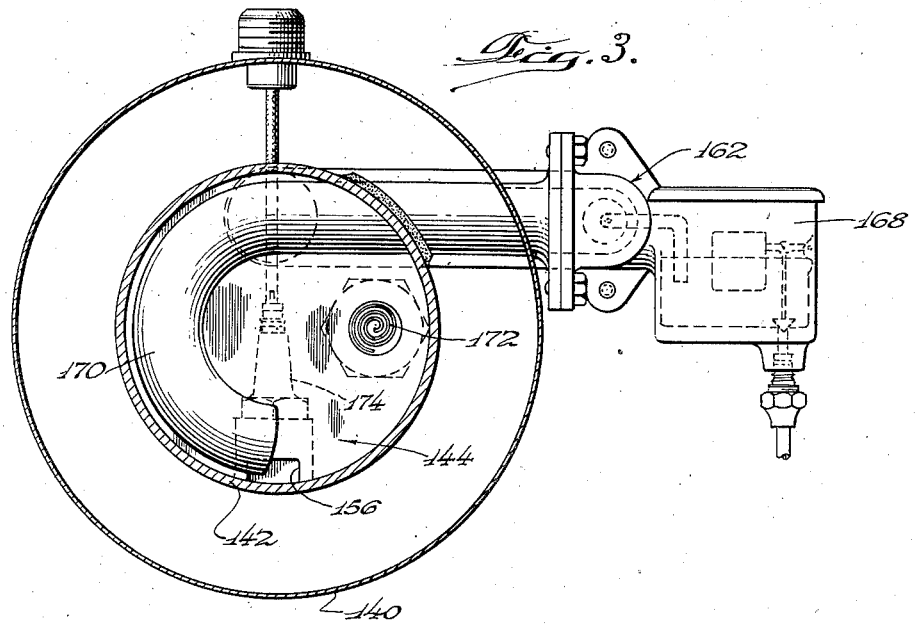
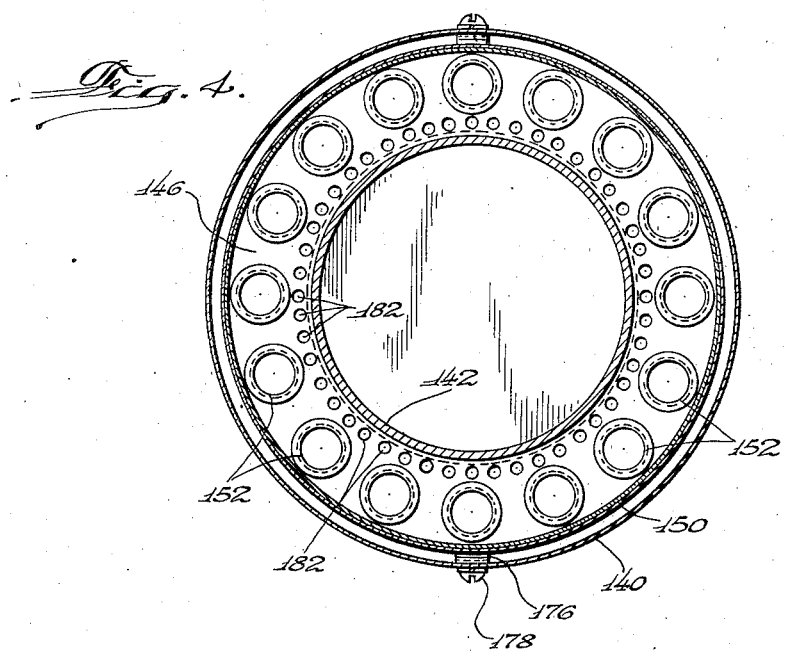

Patented Sept. 9, 1947

2,427,221

UNITED STATES PATENT OFFICE 2,427,221

AIRCRAFT HEATING APPARATUS

Henry J. De N. McCollum, Chicago, Ill.; Thelma McCollum, executrix of said Henry J. De N. McCollum, deceased, assignor to Stewart-Warner Corporation, Chicago, Ill., a corporation of Virginia Application January 15, 1943, Serial No. 472,458

5 Claims. (Cl. 237—32)

My invention relates generally to aircraft heating apparatus and more particularly to apparatus of this character in which combustion takes place in a hermetically sealed combustion space.

The heating of the cabins of airplanes and the heating of various other compartments containing weapons and accessory equipment presents a number of problems which are not encountered in the construction of heating apparatus for other purposes. For example, the limitations as to the weight of the apparatus are severe, and as a result it is necessary that the apparatus be, as far as possible, devoid of heavy components and that, if necessary, high efficiency of operation may be partially sacrificed in favor of lightness in weight, although the considerations of the weight of the apparatus must be balanced against the weight of the fuel required for a given heat output. Another factor which imposes a substantial limitation upon the construction and design of aircraft heating apparatus is due to the extremes of temperature encountered, and the great variation in rate of heat losses from the airplane dependent upon the speed of flight. Another all-important factor is the necessity of safety in operation, not only to eliminate fire hazard, but also to eliminate the possibility of the escape of the products of combustion from the heating apparatus to the air being heated. This is of course of paramount importance in the heating of the cabins of airplanes, since the products of combustion usually contain a toxic percentage of carbon monoxide.

A further consideration for which allowance must be made in the design of the apparatus is that, considering the volume of the space to be heated, heated air must be supplied at a high volumetric rate in order to compensate for probable substantial leakage of air through cracks and openings in the skin of the cabin, and to assure a sufficient addition of heat to the space within the cabin, since the heat losses, by conduction and radiation, as well as due to the escape of heated air from the cabin, are extremely high.

Furthermore, the extreme changes in atmospheric pressure, and the extremely low atmospheric temperature at which combustion must be maintained, are factors which present additional difficulties which must be overcome in the construction and design of aircraft heaters. The possibility of encountering icing conditions is a further factor to be considered.

In the invention disclosed herein, allowance is made for the limitations in construction and design imposed by the foregoing and other factors. For example, the requirement of minimum weight is met in part by utilizing air rams or scoops as a source of air under pressure for supplying not only the air necessary for combustion, but also the ventilating air.

It is thus a primary object of my invention to provide an improved aircraft heating apparatus which is light in weight, which is capable of efficient operation under the widely varying atmospheric temperature and pressure conditions which are encountered, in which the possibility of the escape of toxic products of combustion to the ventilating air is eliminated, which will be reliable in operation, and which may be economically manufactured.

More specifically, it is among the objects of my invention to provide an improved aircraft heating apparatus, in which:

(1) Ventilating and combustion air is supplied to the heating apparatus from a common ram or scoop;

(2) The formation of ice around the ram or scoop is avoided by supplying thereto heat derived from the heating apparatus;

(3) The pressure within the combustion chamber, within the heat exchanger and in the exhaust conduit for the products of combustion is maintained at a lower value than that of the space surrounding these parts, so that even if a leak in these parts should develop, none of the products of combustion will escape to the surrounding air, but instead the flow will be in the reverse direction;

(4) The pressure drop through the fuel mixture supplying conduits is sufficient to cause the pressure within the combustion chamber, and parts connected therewith, to be lower than that of the surrounding ventilating air;

(5) The flow of ventilating air from the heating apparatus is restricted in one or more of several ways, such as by a pressure responsive valve, or because of the frictional resistance of the duct system, so as to maintain the pressure of the ventilating air surrounding the combustion chamber and heat exchanger at a value higher than that within these parts;

(6) The pressure within the combustion chamber and heat exchanger is reduced by the use of a discharge conduit opening at a point along the external skin of the airplane at which the pressure is reduced during flight, or due to the slip stream of the propeller, or both;

(7) Means are provided to control the rate of flow of air from a ram or scoop to the heating apparatus in response to the dynamic air pressure;

(8) Air for both combustion and ventilation is supplied to the heating apparatus from a single ram or scoop, with provisions made to prevent reverse flow from the combustion chamber to the ventilating air space;

(9) The products of combustion leaving the heat exchanger of the apparatus are utilized to heat the air ram or scoop;

(10) The heat exchanger has primary heat exchange surfaces whereby the rate of heat transfer will increase with the velocity of flow upon the opposite sides thereof;

(11) The amount of heat generated and transferred to the ventilating air increases as the speed of the airplane increases, while under these circumstances the temperature of the ventilating air leaving the heating apparatus decreases slightly.

Other objects will appear from the following description, reference being had to the accompanying drawings, in which:

Fig. 1 is a diagrammatic view of one form of heating apparatus utilizing a pressure responsive valve for controlling the ventilating air pressure in the heat exchanger;

Fig. 2 is a longitudinal horizontal sectional view of a heater utilizable in the installations of this invention;

Figs. 3 and 4 are transverse sectional views taken on the lines 3—3 and 4—4, respectively, of Fig. 2;

Fig. 5 is a diagrammatic view of a heater installation illustrating an anti-icing air scoop;

Fig. 6 is a fragmentary sectional view taken on a line 6—6 of Fig. 5; and

Fig. 7 is a diagrammatic view of a modified form of heater installation.

This application is a continuation in part of my copending application, Serial No. 373,751, filed January 9, 1941, in which was disclosed the apparatus substantially as shown in Fig. 1 of this application.

Fig. 1 discloses a heating system of a simple form which incorporates some, but not all, of the advantageous features of the invention, the apparatus being shown as applied to an airplane having a supercharged cabin. In this figure the heater is illustrated as installed in the nacelle 10 of an airplane, a portion of the apparatus, including the fuel supply and carburetor, being located in front of a fire wall 12 to separate it from the heating unit enclosure 20. The direction of flow of the air through the heater is indicated by arrows.

The portion of the apparatus in front of the fire wall 12 includes a blower 16 of sufficient capacity to supercharge the cabin and maintain it at a pressure in excess of six inches of mercury above atmospheric pressure for conditions of high altitude flight. Air is supplied to the blower through an air inlet conduit 14, which preferably opens in the direction of flight and may be in the form of a ram or scoop. Air is discharged from the supercharger blower through a conduit 18 which passes through the fire wall 12 and connects the blower to the inlet of a heating unit assembly enclosure or casing 20. Within the enclosure 20 is a heating unit assembly comprising a number of heating units 22, which may be of the general type disclosed in the prior patent of Henry J. DeN. McCollum and Thomas F. Spackman, No. 2,236,789, granted April 1, 1941.

A combustible mixture of fuel and air is supplied to these units from a supply duct 24 through a pair of intake manifolds 26, each manifold supplying a bank of five of the units 22 in the construction illustrated. A pair of exhaust manifolds 28 conduct the products of combustion from the heater units 22 to an exhaust conduit 30, which later discharges adjacent the outer surface of the airplane, preferably at a point at which the pressure is maintained below atmospheric pressure by the motion of the plane. Because of the pressure drop in the intake conduit 34 and a carburetor 32, the pressure in the combustion chamber is maintained below that of the ventilating air surrounding it.

The combustible mixture is supplied to the intake conduit 24 from the balanced carburetor 32. A fuel pump 36 causes fuel to flow from a suitable fuel supply source 37 through a fuel line 38 to the float bowl of the carburetor 32. A conduit 34 supplies air under pressure from the conduit 18 to the carburetor inlet. The inlet end of the conduit 34 is so disposed with respect to the direction of the flow of air in the conduit 18 that the air pressure in the conduit 34 will ordinarily be slightly less than that within the casing 20.

It is thus seen that under all conditions of operation, the combustion chambers and internal passageways of the heating units 22 are maintained at a lower pressure than the air passing over them. As a result, should a leak develop in the walls of one of these units 22, air would flow into the unit, and none of the toxic gases of combustion could escape into the air being heated.

Heated air flows from the casing 20 through a conduit 40 into the cabin of the airplane. Within the conduit 40 is a thermostatic control element 42 which is connected by a rod 43 with a butterfly valve 44 to regulate the rate of flow of air through the carburetor air supply conduit 34. The thermostatic element 42 and valve 44 are constructed and arranged to increase the rate of flow of air to the carburetor as the temperature of the air within the conduit 40 drops, and to decrease this rate of flow as said temperature rises, thereby maintaining the temperature of the air passing into the cabin substantially constant at the desired value.

The air in the casing 20 and conduit 18 is maintained at a predetermined positive pressure with respect to the surrounding air (generally the atmospheric pressure) by a damper 46 which regulates the rate of flow of air through the outlet conduit 40. The pressure differential is preferably slightly above the minimum necessary to maintain steady operation of the heater, and is ordinarily not great. I have found that a pressure differential in the order of two inches of mercury is usually adequate. The damper 46 is actuated by a rod 48 connected to a differential pressure bellows 50 to move the damper 46 toward closed position whenever the pressure differential decreases and to move the damper 46 toward its full open position whenever the pressure differential increases.

The heater may be supplied with fuel from the engine fuel tanks, or may be provided with a separate fuel tank. A manually operated valve may be provided in the carburetor air intake conduit 34 or in the fuel line 38 to control the operation of the heater. The duct or conduit 40 may be branched to convey the hot air to outlets suitably located for the heating of various compartments of the plane.

Under many circumstances, it is desirable that the heating apparatus be capable of operation while the airplane is on the ground. This may be desirable not only for the comfort of the crew in preparing for a flight, but in the event that the heating apparatus is used to melt ice which has formed upon the wings and control surfaces, it may be essential. The system shown in Fig. 1 may be operated while the airplane is on the ground because of the use of the blower 16 to supply the ventilating and combustion air.

In order to insure that the operation of the heater need not be interrupted due to building up an excessive temperature, and to avoid the necessity of providing additional thermostatic controls, and further, to insure that the rate of heat output of the heater will increase substantially continuously as the speed of flight of the airplane increases, it is desirable that the heat exchanger consist solely or at least in great part, of "primary" heat transfer surfaces.

A heat exchanger having "primary" heat transfer surfaces is one in which the heat transfer from the hotter to the cooler fluid takes place through a wall separating the two fluids and of such thinness that the rate of heat transfer is not materially influenced by the thermal conductivity of the wall, but is mainly dependent upon the rate at which the two fluids flow past the wall. A primary heat transfer surface is thus distinguished from the heat transfer surfaces of heat exchangers employing metallic projections, solid fins, or the like, in which the rate of heat transfer between the two fluids is in large part dependent upon the conductivity of the metal.

An improved form of heater having a heat exchanger which has such primary heat transfer surfaces is shown in Figs. 2, 3 and 4, and may be incorporated in the systems shown in Figs. 5, 6 and 7, inclusive, to be described hereinafter.

Referring to Figs. 2, 3 and 4, the heater comprises an external casing 140, the ends of which are suitably flanged, for attachment to the connecting ducts. A combustion chamber stamping 142 providing a combustion chamber 144, is secured in a flanged inlet head plate 146, as by welding. The inlet head plate 146 and a similar outlet head plate 148 are secured to a heat exchanger shell 150, preferably by having their flanges welded to the shell. A plurality of tubes 152 are secured in the plates 146 and 148, preferably by having beads 153 formed adjacent their ends, and having their extremities expanded and flanged to form sealed connections with the head plates.

It will be noted that the shell 150 and tubes 152, as well as the heads 146 and 148, provide primary heat transfer surfaces in that one side of each of these elements is exposed to the heated products of combustion, while the other side thereof is exposed to the ventilating air. The shell 150 and tubes 152 are preferably made of thin stainless steel sheets and tubes, respectively, with a wall thickness in the order of 0.010 inch.

Thus, while stainless steel is not a very good conductor of heat, the walls of these elements are so thin that heat will be conducted therethrough substantially as fast as it can be transferred to the inner surfaces of the walls and transferred from the outer surfaces of the walls. In other words, the rate at which heat will be transferred from the gases of combustion to the ventilating air will depend almost wholly upon the velocity of the flow of products of combustion past the inner surfaces of these walls and of the velocity of flow of the ventilating air past the outer surface of these walls.

As a result, if the velocity of flow of the products of combustion is increased as the velocity of the ventilating air is increased, the average metal temperature will remain substantially constant, and the rate of heat transfer will correspondingly increase, but such increase in the heat transfer will not be reflected in any increase in the temperature of the ventilating air leaving the heat exchanger. This is a very important consideration in many types of installation of aircraft heaters, when it is desirable that the temperature of the ventilating air supplied to the cabin or other space be maintained below a predetermined value in order to prevent scorching or other damage due to heat, and also is of importance in preventing deterioration or damage to the heat exchanger as a result of the presence of excessively high temperatures.

The fuel supply and combustion apparatus for a heater incorporating a primary heat exchange structure such as shown in Fig. 2, may be of any suitable construction, but is preferably of the general type disclosed in Figs. 2, 3 and 4, and comprises an igniter well 154 which may be welded to the end of the combustion chamber stamping 142, and which, as shown in Fig. 3, communicates with the combustion chamber 144 through an opening 156. The air for combustion is supplied through a tube 160, which may, as shown in Fig. 2, project into the casing 140 and have its open end directed opposite to the direction of flow of the air through the casing 140, or may have its air supplied through a separate scoop or ram.

The tube 160 is suitably connected to a Venturi tube carbureting structure 162, which may consist of a die casting 164 including a jet tube 166 for conveying gasoline or other liquid fuel from a float bowl 168 to suitable jet openings 169 at the throat of the Venturi passageway. In lieu of the float bowl 168, the liquid fuel may be supplied to the jet tube 166 from a suitable source, such as an engine fuel pump, with the rate of flow controlled by apparatus responsive both to the atmospheric pressure and to the speed of the air plane, as more fully disclosed in United States Letters Patent Nos. 2,416,935, dated March 4, 1947, and 2,381,358, dated August 7, 1945.

An inlet tube 170 projects through the casing 140 and through the side wall of the combustion chamber stamping 142 into the combustion chamber 144, being bent into substantially semicircular shape as shown in Fig. 3.

The shell 150 is preferably suitably spaced from the casing 140 and held in position therein by a plurality of clips 176, which may be welded to the shell 150 and detachably secured to the casing 140 by screws 178. An outlet fitting 180 is preferably provided with a flange welded to the shell 150 and is adapted to receive an exhaust conduit 181 through which the products of combustion are discharged. This exhaust conduit may be secured to the fitting 180 by a tight press fit or in any other suitable manner.

In order to assure complete combustion, and to minimize acoustic vibration, and for other reasons, it is frequently desirable to provide openings, such as openings 182, in the head 146 of the inlet end of the heat exchanger.

The heater shown in Figs. 2, 3 and 4 is of particular utility when employed in a heating system in which both the ventilating air and the air for combustion are supplied from a common source at the same or substantially the same pressures. Heating systems of this type are diagrammatically shown in Figs. 5, 6 and 7, inclusive.

In the heating system shown in Figs. 5 and 6, the inlet end of the casing 140 is connected to a double elbow fitting 210 which terminates in a scoop 212 extending beyond the skin 214 of the airplane in which the heater is installed. The exhaust conduit 181 from the heater leads to a jacket 216 which substantially surrounds the ram portion 212 of the fitting 210. The jacket 216 is of suitably stream-lined conformation and has an exhaust port 218 at its trailing end.

While it is usually desirable that the heat output of the heater increase as the speed of the airplane is increased, there are some circumstances under which this is not desirable, but, instead, it is preferred that the heat output remain relatively constant, under which circumstances, the heating system may, as shown in Fig. 5, be provided with a butterfly valve 220 located in the inlet elbow fitting 210 so as to control the velocity of flow of the air for combustion and the ventilating air.

The position of the valve 220 is preferably made responsive to the difference between the pressure in the inlet fitting 210 and atmospheric pressure, and means for accomplishing this result is diagrammatically illustrated as comprising a motor device 222, the movable element of which is connected by an actuating rod 224 with the valve 220. The motor 222 is responsive to the pressure in the inlet fitting by virtue of an opening 226 in the fitting 210 and by virtue of a connection with the atmosphere through a conduit 228.

The valve 220, together with its motor device 222, may be arranged to cause the heater to have substantially uniform heat output at all speeds, or to have the heat output increase somewhat with increased speed, depending upon the rates of heat loss from the space being heated at various airplane speeds.

Because of the fact that the products of combustion from the heater flow from the exhaust conduit 181 through the space between the scoop 212 and the jacket 216, and since the exhaust gases are usually at a fairly high temperature, the scoop 212 will be retained at a sufficiently high temperature to prevent the formation of ice, or to remove any ice which has collected thereon prior to the time the heater started operation. The jacketing of the inlet air scoop also has the advantage of preheating the air intake slightly, with the consequence that the vaporization of the fuel is somewhat improved.

It will be understood that the heater within the casing 140 may be of any suitable type, but that the best results are obtained when the heater includes a heat exchanger having primary heat transfer surfaces, such as the heater shown in Figs. 2, 3 and 4.

In the form of the invention shown in Fig. 7, a heater such as shown in Figs. 2, 3 and 4, and including a casing 140 has an inlet duct 280 connected thereto and terminating in a ram opening 282. The inlet duct 280 has a Y-branch 284 leading to a carbureting device 286 for supplying combustible mixture to the heater. The products of combustion are drawn through the conduit 181 and circulate about the inlet duct 280 due to the provision of a jacket 288 surrounding the major portion of this duct, the products of combustion being exhausted through a trailing discharge pipe 290. The ventilating air is conveyed from the heater to a cabin 292 through an elbow duct 294.

In the forms of the heating systems disclosed herein in which scoops are used, they are illustrated as being of the fixed type. It will be understood, however, that the constructions may be suitably modified to enable the scoops to be retractible to positions in which they are flush or substantially flush with the skin of the airplane. Thus, when the heating system is not in use, the scoop or scoops may be retracted to reduce the frontal area of the airplane, and thereby reduce the drag.

While I have shown and described particular embodiments of my invention, it will be apparent to those skilled in the art, that the underlying principles of the invention may be embodied in numerous other forms without departing from the underlying principles of the invention. I therefore desire, by the following claims, to include within the scope of my invention, all such modifications and variations of the invention disclosed by which substantially the results of the invention may be obtained by the use of substantially the same or equivalent means.

I claim:

1. In an aircraft heating system having a combustion chamber and a heat exchanger connected to receive products of combustion therefrom, means including an opening to the atmosphere directed forwardly of the airplane to supply combustion air to said chamber and to supply ventilating air to said heat exchanger, a jacket around a portion of said means, ventilating air duct means connected to the outlet of said heat exchanger for conveying heated air therefrom to a space to be heated, and conduit means including said jacket for conveying the products of combustion from said heat exchanger to the atmosphere.

2. In an airplane heating system, the combination of a combustion chamber, a heat exchanger, air ram means for supplying air for combustion to said combustion chamber and for supplying ventilating air to said heat exchanger, said air ram means supplying air at the dynamic pressure resultant from the flight of the airplane through the atmosphere, a valve for regulating the rate of flow of air through said air ram means, and means responsive to the pressure of the air in said air ram to move said valve toward closed position upon an increase in pressure and toward open position upon a decrease in pressure.

3. An anti-icing air scoop, comprising a structure projecting from the wall of an aircraft, said structure providing an air inlet passage having an opening adapted to face forwardly upon an aircraft and a space for exhaust gases completely surrounding said air inlet passage at said opening and open at the rear to the atmosphere, said structure being adapted to project into an air stream created by operation of said aircraft.

4. An aircraft heater installation, comprising an aircraft, a heater on said aircraft and having a combustion chamber and a heat exchanger for receiving hot products of combustion from said chamber, means providing a passage including an opening to atmosphere directed toward the front of the aircraft to supply air to said combustion chamber, an exhaust jacket closed at its forward portion surrounding a portion of said passage and extending to a point immediately adjacent said opening, said jacket being open to the atmosphere at its rear portion, and a pipe for conducting exhaust gases from said heat exchanger to said jacket.

5. An aircraft heater installation of the class described comprising an aircraft, a heater on said aircraft and having a combustion chamber and a heat exchanger for receiving hot products of combustion from said chamber, an anti-icing scoop having means providing a passage including an opening to atmosphere directed toward the front of the aircraft to supply air to said chamber, means forming an exhaust jacket surrounding a portion of said passage and having a part immediately adjacent said opening, said jacket being open to the atmosphere to the rear of said opening, and means for conducting exhaust gases from said heat exchanger to the forward portion of said jacket.

HENRY J. DE N. McCOLLUM.

REFERENCES CITED

The following references are of record in the file of this patent:

UNITED STATES PATENTS

| Number | Name | Date |
| --- | --- | --- |
| 2,321,940 | Robertson | June 15, 1943 |
| 1,357,598 | Thompson | Nov. 2, 1920 |
| 2,286,853 | Holthouse | June 16, 1942 |
| 2,262,003 | Huffman | Nov. 11, 1941 |
| 2,179,500 | Diehl | Nov. 14, 1939 |
| 2,230,446 | Baker | Feb. 4, 1941 |
| 2,265,168 | Huffman | Dec. 9, 1941 |
| 2,330,298 | McCollum | Sept. 28, 1943 |
| 2,364,458 | McCollum | Dec. 5, 1944 |